(12) United States Patent
Triller et al.

(10) Patent No.: US 7,815,537 B2
(45) Date of Patent: Oct. 19, 2010

(54) POWER-BRANCHED AUTOMATIC VEHICLE TRANSMISSION WITH A CVT-VARIABLE SPEED DRIVE

(75) Inventors: Andreas Triller, Bühl (DE); Emmanuel Simon, Herrlisheim (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 296 days.

(21) Appl. No.: 12/215,036

(22) Filed: Jun. 23, 2008

(65) Prior Publication Data

US 2009/0017957 A1    Jan. 15, 2009

Related U.S. Application Data

(60) Provisional application No. 60/936,540, filed on Jun. 21, 2007.

(51) Int. Cl.
*F16H 37/02*    (2006.01)
(52) U.S. Cl. .................................................. 475/210
(58) Field of Classification Search ............... None
See application file for complete search history.

(56) References Cited

U.S. PATENT DOCUMENTS

| | | | | | |
|---|---|---|---|---|---|
| 3,106,855 | A | * | 10/1963 | Artur Tietze | 475/210 |
| 5,564,998 | A | * | 10/1996 | Fellows | 475/216 |
| 2005/0255956 | A1 | | 11/2005 | Lauinger et al. | 475/210 |
| 2009/0017959 | A1 | * | 1/2009 | Triller | 475/210 |
| 2009/0017960 | A1 | * | 1/2009 | Triller et al. | 475/214 |

FOREIGN PATENT DOCUMENTS

| | | | |
|---|---|---|---|
| DE | 10 2005 036803 B3 | 5/2007 |
| EP | 0 775 853 A2 | 5/1997 |
| EP | 1 726 850 A2 | 11/2006 |
| WO | WO 2004/038257 A1 | 5/2004 |

\* cited by examiner

*Primary Examiner*—Dirk Wright
(74) *Attorney, Agent, or Firm*—Alfred J. Mangels

(57) ABSTRACT

Structures of automatic vehicle transmissions are described which have a planetary gear train connected to an input shaft. The planetary gear train is connected through a CVT variable speed drive that includes two variable speed drive shafts and through at least one gear pairing to an output shaft. Rotationally fixed connections corresponding to different gear ranges are producible between shafts of the transmission through gear pairings and or shaft connections provided with clutches.

11 Claims, 6 Drawing Sheets

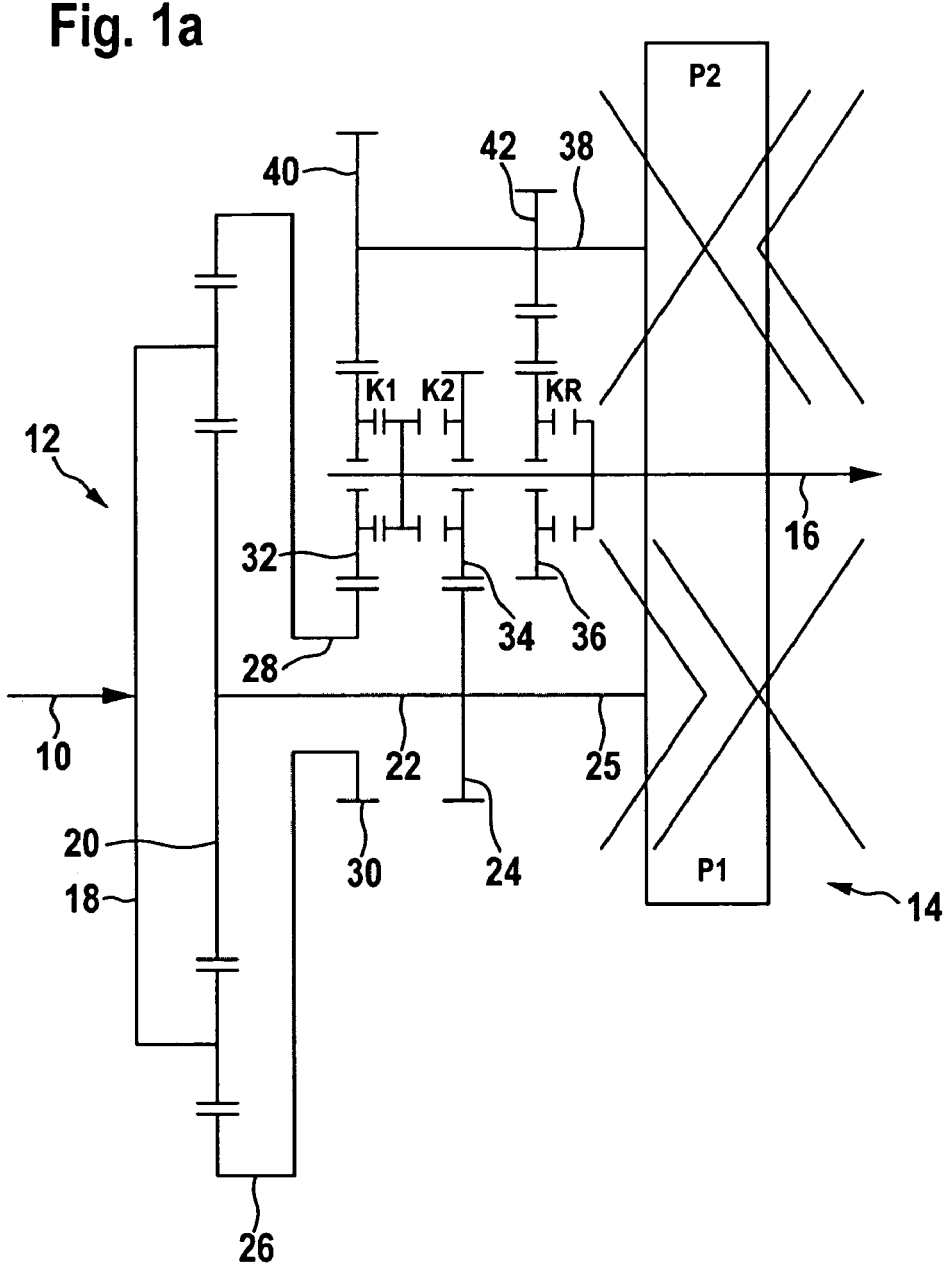

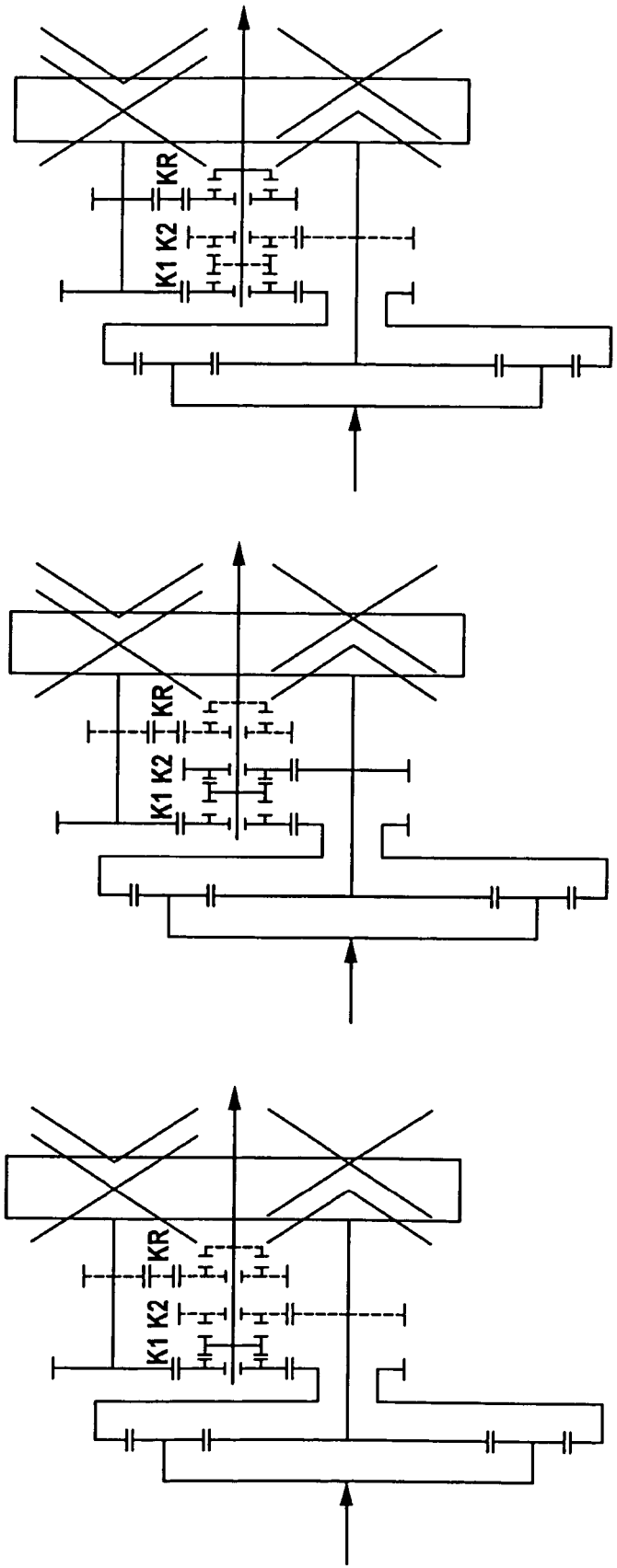

|  | K1 | K2 | K3 | K4 | K5 | K6 | K7 | K8 |
|---|---|---|---|---|---|---|---|---|
| R | x | - | - | x | x | - | - | x |
| N | - | - | - | - | - | - | - | - |
| D-Low | x | - | - | x | x | - | x | - |
| D-High | - | x | x | - | - | x | x | - |

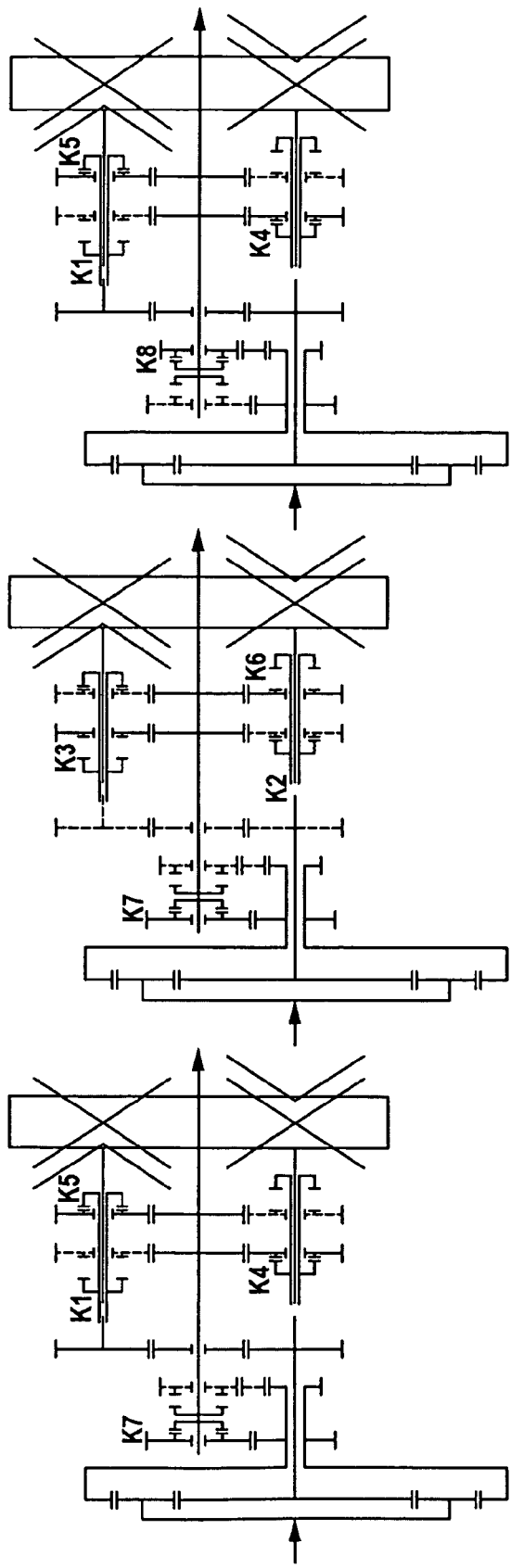

|   | K1 | KW | K3 | K4 | KR |
|---|----|----|----|----|----|
| R | - | - | x | - | x |
| N | - | - | - | - | - |
| D-Low | x | - | - | x | - |
| D-High-1 | x | x | - | - | - |
| D-High-2 | x | - | x | - | - |

D-Low range

D-High-1 range

D-High-2 range

R range

POWER-BRANCHED AUTOMATIC VEHICLE TRANSMISSION WITH A CVT-VARIABLE SPEED DRIVE

BACKGROUND OF THE INVENTION

1. Field of the Invention

The present invention relates to an automatic vehicle transmission having a planetary gear train connected to an input shaft, which planetary gear train is connected to an output shaft through a CVT variable speed drive having two drive shafts and at least one gear pairing. The transmission includes at least three clutches, the operation of which enables selection of the gear ranges R, N, D-Low, and D-High.

2. Description of the Related Art

A vehicle transmission of the type described above is known from International Patent Publication No. WO 2004/038257. In that arrangement the input shaft of the transmission, which is connected to an internal combustion engine through a torque converter, is connected to the planet carrier of the planetary gear train. The ring gear of the planetary gear train is connected to the drive shaft of the variable speed drive on which an output shaft gear is supported that is non-rotatably connected to an output shaft. The output shaft gear is connected through a clutch to the one variable speed drive shaft in a rotationally fixed connection. The sun gear of the planetary gear train meshes with a first intermediate shaft gear that is non-rotatably connected to an intermediate shaft on which a second intermediate shaft gear is supported and which meshes with the output shaft gear and is non-rotatably connected by means of a clutch to the intermediate shaft. The first intermediate shaft gear also meshes with a gear that is non-rotatably connected to the other variable speed drive shaft on which another gear is rotatably supported and which is non-rotatably connected to the other variable speed drive shaft through a reverse travel clutch.

An object of the present invention is to provide an automatic vehicle transmission of the type described above that operates at good efficiency, that enables widely spread forward gear ranges, and that enables the installation of a torque converter in such a way that the resulting increase in torque does not go through the variable speed drive when conversion occurs.

SUMMARY OF THE INVENTION

In accordance with a first embodiment of the present invention, an automatic vehicle transmission includes a planetary gear train that is connected to an input shaft. The planetary gear train is connected to an output shaft through a CVT variable speed drive having two drive shafts and at least one gear pairing, and at least three clutches, the operation of which enables selection of the gear ranges R, N, D-Low, and D-High. The planet carrier is connected to the input shaft. The sun gear of the planetary gear train is non-rotatably connected to a sun gear shaft that carries a sun gear shaft gear and that is non-rotatably connected to a first variable speed drive shaft. The ring gear is non-rotatably connected to a ring gear shaft that non-rotatably carries a ring gear shaft gear that meshes with a first output shaft gear supported on the output shaft. The output shaft gear meshes with a first variable speed drive shaft gear that is non-rotatably connected to the second variable speed drive shaft. A second output shaft gear carried by the output shaft meshes with the sun gear shaft gear, and a third output shaft gear carried by the output shaft meshes with a second variable speed drive shaft gear carried by the second variable speed drive shaft. The first output shaft gear is non-rotatably connected to the output shaft by means of a first clutch, the sun gear shaft is non-rotatably connected to the output shaft by means of a second clutch, and the third output shaft gear is non-rotatably connected to the second variable speed drive shaft by means of a reverse clutch.

Advantageously, the second variable speed drive shaft gear is non-rotatably connected to the second variable speed drive shaft, the sun gear shaft gear is non-rotatably connected to the sun gear shaft, and the first, second, and third output shaft gears are rotatably supported on the output shaft and are non-rotatably connected to the output shaft by means of one of the associated clutches.

The sun gear shaft is preferably non-rotatably connected to the first variable speed drive shaft.

In accordance with a second embodiment of the present invention, an automatic vehicle transmission includes a planetary gear train that is connected to an input shaft, and that is connected to an output shaft through a CVT variable speed drive having two variable speed drive shafts, at least one gear pairing, and at least three clutches, the operation of which enables selection of the gear ranges R, N, D-Low, and D-High. The planet carrier of the planetary gear train is non-rotatably connected to the input shaft, the ring gear of the planetary gear train is non-rotatably connected to a ring gear shaft which carries a first and a second ring gear shaft gear. An intermediate shaft is provided that carries a first and a second intermediate shaft gear, on which shaft a third intermediate shaft gear is supported, and on which a fourth intermediate shaft gear is non-rotatably connected. The first ring gear shaft gear meshes with the first intermediate shaft gear, the second ring gear shaft gear meshes through an intermediate gear with the second intermediate shaft gear. The third intermediate shaft gear meshes with a sun gear shaft gear that is non-rotatably connected to the sun gear shaft of the planetary gear train and meshes with a connecting gear. A first and a second variable speed drive gear are supported on a first variable speed drive shaft, and a third and a fourth variable speed drive shaft gear are supported on the second variable speed drive shaft. The fourth intermediate shaft gear meshes with the first and the third variable speed drive shaft gears. An output shaft gear that is non-rotatably connected to the output shaft meshes with the second and the fourth variable speed drive shaft gears. The first variable speed drive gear is non-rotatably connected to the first variable speed drive shaft through a first clutch, and the sun gear shaft is non-rotatably connected to the second variable speed drive shaft through a second clutch. The first through fourth variable speed drive shaft gears, which are rotatably supported on the respective variable speed drive shafts, are each non-rotatably connected to the corresponding variable speed drive shaft through third through sixth clutches. A rotationally fixed connection between the first and second ring gear shaft gears and the respective first and second intermediate shaft gears is achieved by respective seventh and eighth clutches.

In the above-described transmission, the first and the second intermediate shaft gears can be rotatably supported on the intermediate shaft and can be non-rotatably connected to the intermediate shaft by means of the seventh and eighth clutches. The first and second ring gear shaft gears are non-rotatably connected to the ring gear shaft.

The third clutch is advantageously disengageable simultaneously with the engagement of the first and fifth clutches.

The fourth clutch is advantageously disengageable simultaneously with the engagement of the second and sixth clutches.

The sun gear shaft can be situated coaxially to the ring gear shaft and can extend within the ring gear shaft.

In accordance with a third embodiment of the present invention, an automatic vehicle transmission includes a planetary gear train connected to an input shaft, and that is connected to an output shaft through a CVT variable speed drive having two variable speed drive shafts, at least one gear pairing, and at least three clutches, the operation of which enables selection of the gear ranges R, N, D-Low, and D-High. The planetary gear train is designed as a plus gear set, whose ring gear is non-rotatably connected to the input shaft, whose two planet carriers are non-rotatably connected to a common planet carrier shaft which is non-rotatably connected to a planet carrier shaft gear, and whose sun gear is non-rotatably connected to a sun gear shaft which is non-rotatably connected to a sun gear shaft gear. A first variable speed drive shaft is non-rotatably connected to a first variable speed drive shaft gear and through an intermediate gear that meshes with the planet carrier shaft gear. A second variable speed drive shaft is non-rotatably connected to a second variable speed drive shaft gear and carries a third variable speed drive shaft gear that is rotatably supported on it. An intermediate shaft is provided that is non-rotatably connected to a first intermediate shaft gear which meshes with the sun shaft gear and the second variable speed drive shaft gear, and it carries a second intermediate shaft gear and a third intermediate shaft gear. Rotatably supported on the output shaft is a first output shaft gear that meshes with the third variable speed drive shaft gear and with the second intermediate shaft gear. The output shaft carries a second output shaft gear that meshes with the third intermediate shaft gear, and a shaft coupling is provided with which the first variable speed drive shaft is non-rotatably connected to the output shaft. A reverse clutch is provided with which the third variable speed drive shaft gear is non-rotatably connected to the second variable speed drive shaft. A first and a third clutch are provided with which the second intermediate shaft gear is non-rotatably connected to the intermediate shaft or to the first output shaft gear that is non-rotatably connected to the output shaft. A fourth clutch is provided with which the output shaft is non-rotatably connected to the intermediate shaft through the second output shaft gear and the third intermediate shaft gear.

In the above-described transmission, the sun gear shaft is advantageously situated coaxially to the planet carrier shaft and extends through the planet carrier shaft.

BRIEF DESCRIPTION OF THE DRAWINGS

The structure, operation, and advantages of the present invention will become further apparent upon consideration of the following description, taken in conjunction with the accompanying drawings in which:

FIGS. 1a through 1e show a block diagram of a first embodiment of a vehicle transmission in accordance with the present invention, along with schematic diagrams of the clutch operation, and a functional block diagram of the transmission with actuated clutches in the various operating positions;

FIGS. 2a through 2e show a block diagram of a second embodiment of a vehicle transmission in accordance with the present invention, along with schematic diagrams of the clutch operation, and a functional block diagram of the transmission with actuated clutches in the various operating positions.

DESCRIPTION OF THE PREFERRED EMBODIMENTS

Figures 2A, 2B:
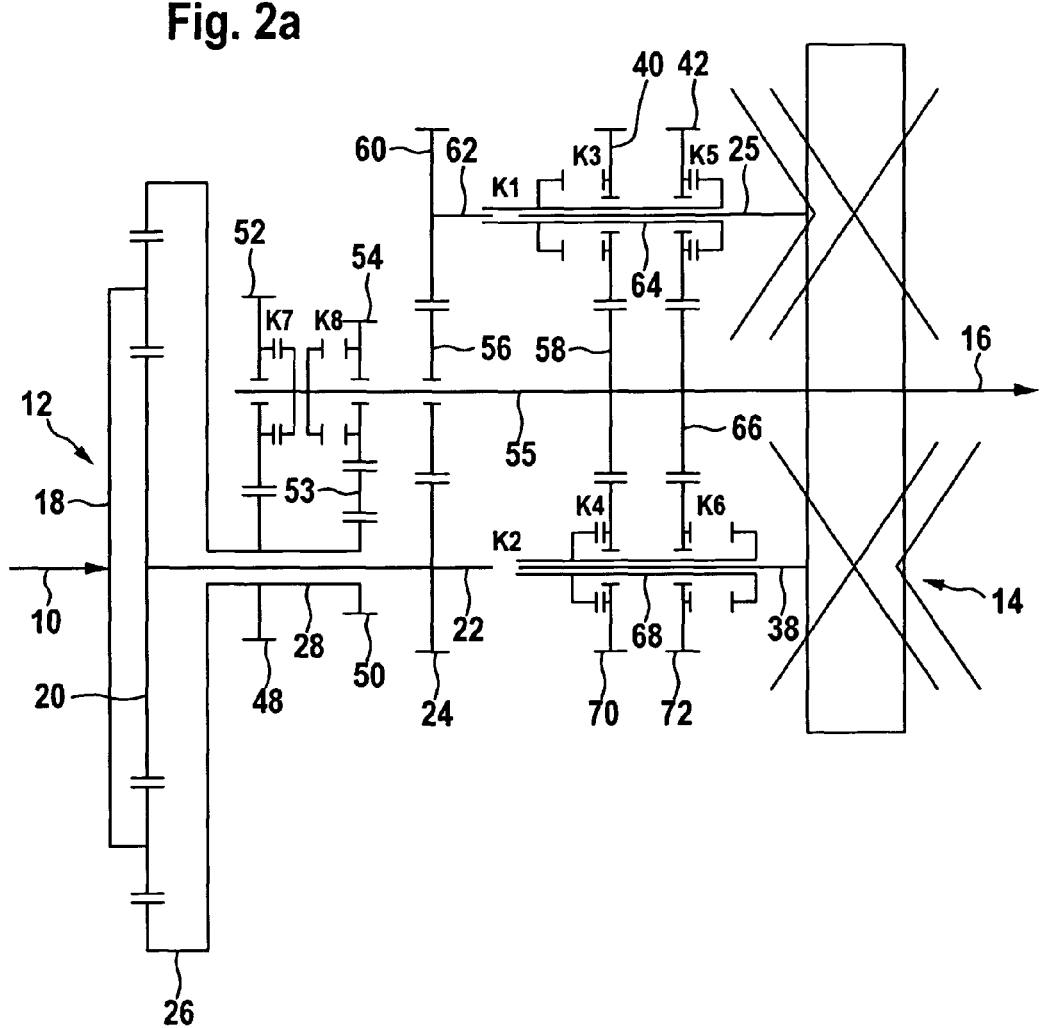

The invention will be explained below on the basis of the figures in its three exemplary embodiments. Arrows shown on shafts specify the direction of torque transmission. The CVT variable speed drive (gear stage with continuously variable transmission ratio) is illustrated in each case as an inherently known belt-driven conical-pulley transmission, in which an endless torque-transmitting means encircles two conical disk pairs. The transmission ratio is changed by changing the spacing between the pairs of conical disks in opposite directions. The variable speed drive can be replaced by any other transmission having a continuously variable transmission ratio between two shafts.

In accordance with FIG. 1a, a power-branched vehicle transmission contains a planetary gear train 12 connected to an input shaft 10. The planetary gear train is connected through various gear pairings to a CVT variable speed drive 14 and to an output shaft 16. Planet carrier 18 of planetary gear train 12 is non-rotatably connected to input shaft 10. Sun gear 20 includes a sun gear shaft 22, which is non-rotatably connected to a sun shaft gear 24 and to a first variable speed drive shaft 25 of CVT variable speed drive 14.

Ring gear 26 of planetary gear train 12 is non-rotatably connected to a ring gear shaft 28, which, in turn, is non-rotatably connected to a ring gear shaft gear 30.

A first output shaft gear 32, a second output shaft gear 34, and a third output shaft gear 36 are rotatably supported on output shaft 16.

A first variable speed drive shaft gear 40 and a second variable speed drive shaft gear 42 are non-rotatably connected to a second variable speed drive shaft 38.

A first clutch K1 is provided to connect the first output shaft gear 32 to the output shaft 16 in a rotationally fixed connection. A clutch K2 is provided to non-rotatably connect the second output shaft gear 34 to the output shaft 16. A reverse clutch KR is provided for non-rotatably connecting the third output shaft gear 36 to the output shaft 16, which serves to engage a reverse gear range.

The chart in FIG. 1b shows the clutch operations for selecting the gear ranges R (reverse), N (neutral), D-Low (forward travel with high transmission ratio), and D-High (forward travel with lower transmission ratio). The additional functional diagrams 1c through 1e derived from the block diagram of FIG. 1a show the torque transmission paths for the respective gear ranges. The clutches are actuated by a gear selector lever in a known manner. The transmission ratio of CVT variable speed drive 14 is controlled by an electronic control device and is a function of the operating parameters of the vehicle, such as accelerator pedal position, velocity of the vehicle, speed of rotation of the drive engine, etc.

FIG. 2a shows another embodiment of an automatic vehicle transmission in accordance with the present invention. Input shaft 10 is again non-rotatably connected to planet carrier 18 of planetary gear train 12. Sun gear 20 includes a shaft 22 that extends through a shaft 28 of ring gear 26 and that non-rotatably carries a sun gear shaft gear 24.

A first 48 and a second 50 ring gear shaft gear are non-rotatably connected to ring gear shaft 28, the first of which gears meshes with a first intermediate shaft gear 52 and the second of which meshes through a reversing gear 53 with a second intermediate shaft gear 54. Intermediate shaft gears 52 and 54 are supported on an intermediate shaft 55, which carries a third intermediate shaft gear 56 that is supported on it and that meshes with sun shaft gear 24, and it also non-rotatably carries a fourth intermediate shaft gear 58.

Third intermediate shaft gear 56 meshes with a connecting gear 60, which is non-rotatably connected to a connecting gear shaft 62.

A first variable speed drive shaft gear 40 and a second variable speed drive shaft gear 42 are non-rotatably supported on a hollow first sliding shaft 64, with first variable speed drive shaft gear 40 meshing with fourth intermediate shaft gear 58. Received in first sliding shaft 64 is the first variable speed drive shaft 25, which is non-rotatably connected through a splined connection, for example, to first sliding shaft 64.

Output shaft 16 is non-rotatably connected to an output shaft gear 66, which meshes with second variable speed drive shaft gear 42.

The second variable speed drive shaft 38 is received in a second sliding shaft 68 and is non-rotatably connected to second sliding shaft 68, for example through a splined connection. A third variable speed drive shaft gear 70 and a fourth variable speed drive shaft gear 72 are rotatably supported on second sliding shaft 68. Third variable speed drive shaft gear 70 meshes with the fourth intermediate shaft gear 58. Fourth variable speed drive shaft gear 72 meshes with output shaft gear 66.

A total of eight clutches are provided to operate the described transmission:

When first sliding shaft 64 is shifted to the left in accordance with the figure, a first clutch K1 non-rotatably connects connecting gear shaft 62 to the first variable speed drive shaft 25, through a meshing of the spline teeth formed on the inside of the sliding shaft with spline teeth formed on the outside of connecting gear shaft 62.

A second clutch K2 non-rotatably connects second sliding shaft 68 to sun gear shaft 22 in a similar manner.

Third through sixth clutches non-rotatably connect the variable speed drive shaft gears to the respective sliding shafts or variable speed drive shafts. As can be seen from FIG. 2a, clutches K1 and K5 (associated with second variable speed drive shaft gear 42) are engaged simultaneously, while at the same time clutch K3 (associated with first variable speed drive shaft gear 40) is disengaged.

In a similar manner, clutches K2 and K6 (associated with fourth variable speed drive shaft gear 72) are engaged simultaneously, while at the same time fourth clutch K4 (associated with third variable speed drive shaft gear 70) is disengaged.

First intermediate shaft gear 52 is non-rotatably connected to intermediate shaft 55 by means of a seventh clutch K7. An eighth clutch K8 is provided to non-rotatably connect second intermediate shaft gear 54 to intermediate shaft 55.

FIG. 2b shows the shift pattern of the clutches. With this transmission embodiment a reverse gear, a neutral setting, a D-Low gear range, and a D-High gear range can be selected.

The respective torque flows are indicated in the diagrams in FIGS. 2c through 2e showing the different gear ranges.

Figures 3A, 3B:
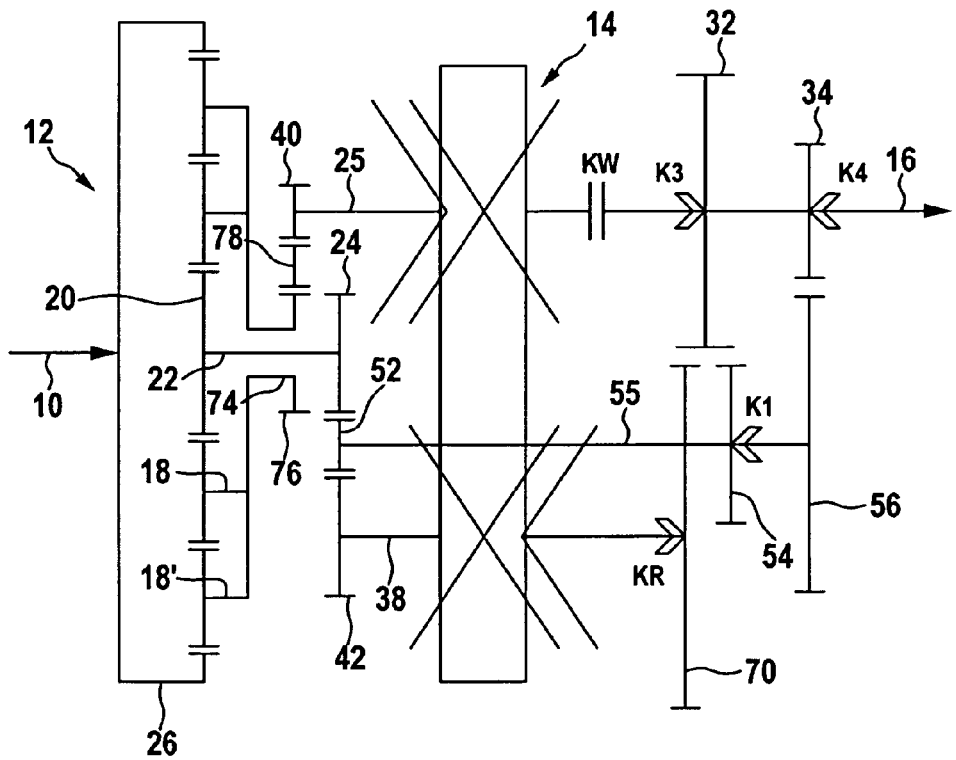
FIGS. 3a through 3f show a block diagram of a third embodiment of a vehicle transmission in accordance with the present invention, along with schematic diagrams of the clutch operation, and a functional block diagram of the transmission with actuated clutches in the various operating positions
Figure 3C:
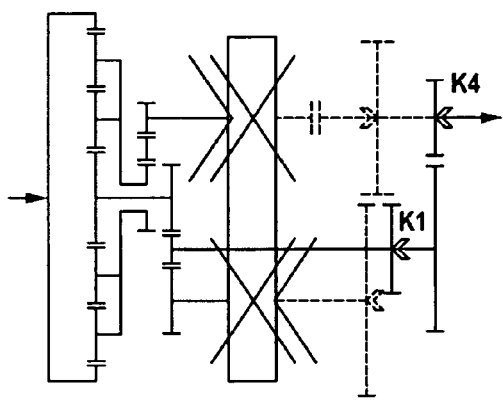
Figure 3D:
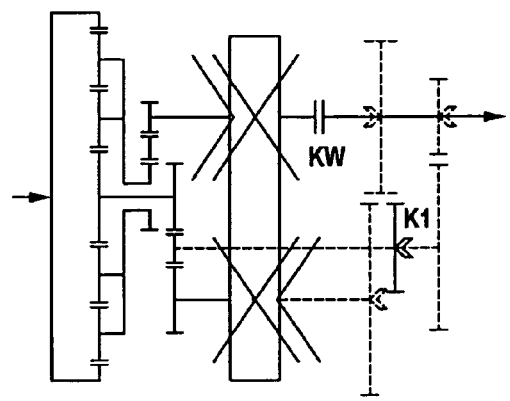
Figure 3E:
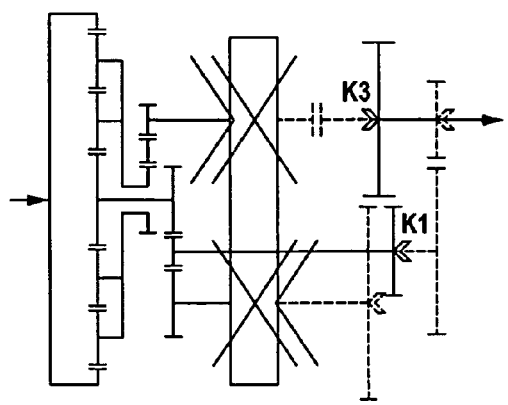
Figure 3F:
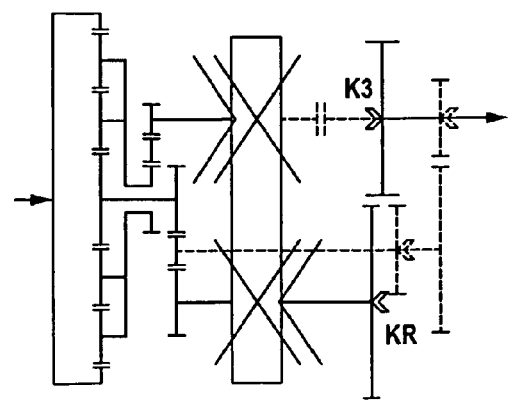

FIG. 3a shows another embodiment of an automatic vehicle transmission in accordance with the present invention:

In this embodiment planetary gear train 12 is designed as a plus gear set with two planet carriers 18 and 18', so that sun gear 20 and ring gear 26 rotate in the same direction. Input shaft 10 is non-rotatably connected to ring gear 26. Planet carriers 18 and 18' are non-rotatably connected to a planet carrier shaft 74 that non-rotatably carries a planet carrier shaft gear 76. Sun gear shaft 22, to which a sun gear shaft gear 24 is non-rotatably connected, extends through planet carrier shaft 74. First variable speed drive shaft 25 of CVT variable speed drive 14 is non-rotatably connected to a first variable speed drive shaft gear 40, which meshes with planet carrier gear 76 through an intermediate gear 78. First variable speed drive shaft 25 is also non-rotatably connected through a shaft coupling KW to output shaft 16, on which a first output shaft gear 32 and a second output shaft gear 34 are supported.

An intermediate shaft 55 is non-rotatably connected to a first intermediate shaft gear 52 and to a third intermediate shaft gear 56, which meshes with second output shaft gear 34, and shaft 55 rotatably carries a second intermediate shaft gear 54.

Second variable speed drive shaft 38 is non-rotatably connected to a second variable speed drive shaft gear 42, and it rotatably carries a third variable speed drive shaft gear 70. Second variable speed drive shaft gear 42 meshes with first intermediate shaft gear 52. Third variable speed drive shaft gear 70 meshes with first output shaft gear 32, as second intermediate shaft gear 54 does also.

To operate the transmission, in addition to the shaft coupling KW, a first, third, and fourth clutch K1, K3, and K4 are provided, with which second intermediate shaft gear 54 is non-rotatably connected to intermediate shaft 55, first output shaft gear 32 is connected to output shaft 16 in a rotationally fixed connection, and second output shaft gear 34 is non-rotatably connected to output shaft 16, respectively. Also provided is a reverse clutch KR, with which third variable speed drive shaft gear 70 is non-rotatably connected to second variable speed drive shaft 38.

The shift patterns of the clutches for selecting five gear ranges, namely R, N, D-Low, D-High-1, and D-High-2, are shown in FIG. 3b. The torque flow paths are indicated in the range diagrams shown in FIGS. 3c through 3f.

The described transmission structures can be modified in many ways. For example, gears and corresponding clutches that non-rotatably connect a gear to a corresponding shaft can also be situated on the respective other shaft, in which case the rotatable support of the one gear on the one shaft and the rotationally fixed connection of the other gear on the other shaft are exchanged. For example, clutch K4 shown in FIG. 3a can be situated on third intermediate shaft gear 56, and second output shaft gear 34 can be non-rotatably connected to output shaft 16. The rotationally fixed connections between the gears and the respective shafts, which are not brought about by means of clutches, can be replaced with rigid connections. The respective transmission ratios that are brought about through the gear pairings are chosen as appropriate.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An automatic vehicle transmission comprising: an input shaft and an output shaft; a planetary gear train connected to the input shaft and connected to the output shaft through a CVT variable speed drive having two variable speed drive shafts and at least one pair of gear; and at least three clutches the operation of which enables selection of gear ranges R, N, D-Low, and D-High; wherein a planet carrier of the planetary gear train is non-rotatably connected to the input shaft; a sun gear of the planetary gear train is non-rotatably connected to a sun gear shaft that non-rotatably carries a sun gear shaft gear and is non-rotatably connected to a first variable speed drive shaft; a ring gear of the planetary gear train is non-rotatably connected to a ring gear shaft that is non-rotatably connected to a ring gear shaft gear that meshes with a first output shaft gear supported on the output shaft, which output shaft gear meshes with a first variable speed drive shaft gear that is non-rotatably connected to a second variable speed drive shaft; a second output shaft gear carried by the output shaft that meshes with the sun shaft gear; a third output shaft gear that is carried by the output shaft meshes with a second variable speed drive shaft gear that is carried by the second variable speed drive shaft; wherein the first output shaft gear is non-rotatably connected to the output shaft by a first clutch; the sun gear shaft is non-rotatably connected to the output shaft by a second clutch; and the third output shaft gear is non-rotatably connected to the second variable speed drive shaft by a reverse clutch.

2. A vehicle transmission in accordance with claim 1, wherein the second variable speed drive shaft gear is non-rotatably connected to the second variable speed drive shaft; the sun gear shaft gear is non-rotatably connected to the sun gear shaft; and the first, second, and third output shaft gears are rotatably supported on the output shaft and are each non-rotatably connected to the output shaft by means of a respective clutch.

3. A vehicle transmission in accordance with claim 1, wherein the sun gear shaft is rigidly connected to the first variable speed drive shaft.

4. An automatic vehicle transmission comprising: an input shaft and an output shaft; a planetary gear train connected to the input shaft and connected to the output shaft through a CVT variable speed drive having two variable speed drive shafts and at least one pair of gears, and at least three clutches that enable selection of gear ranges R, N, D-Low, and D-High; wherein a planet carrier of the planetary gear train is non-rotatably connected to the input shaft; a ring gear of the planetary gear train is non-rotatably connected to a ring gear shaft that carries a first and a second ring gear shaft gear; an intermediate shaft that carries a first and a second intermediate shaft gear and on which a third intermediate shaft gear is supported and which is non-rotatably connected to a fourth intermediate shaft gear; wherein the first ring gear shaft gear meshes with the first intermediate shaft gear, the second ring gear shaft gear meshes with the second intermediate shaft gear through an intermediate gear, and the third intermediate shaft gear meshes with a sun gear shaft gear that is non-rotatably connected to a sun gear shaft of the planetary gear train and with a connecting gear; a first and a second variable speed drive shaft gear supported on a first variable speed drive shaft; a third and a fourth variable speed drive shaft gear supported on a second variable speed drive shaft, wherein the fourth intermediate shaft gear meshes with the first and the third variable speed drive shaft gears; an output shaft gear non-rotatably connected to the output shaft and that meshes with the second and the fourth variable speed drive shaft gears; wherein the connecting gear is non-rotatably connected to the first variable speed drive shaft through a first clutch, the sun gear shaft is non-rotatably connected to the second variable speed drive shaft through a second clutch, the first through fourth variable speed drive shaft gears are rotatably supported on the variable speed drive shafts are non-rotatably connected to a respective corresponding variable speed drive shaft through a respective third through sixth clutch; and a rotationally fixed connection is provided between the first and second ring gear shaft gears and the first and second intermediate shaft gears by a respective seventh and eighth clutch.

5. A vehicle transmission in accordance with claim 4, wherein the first and the second intermediate shaft gears are rotatably supported on the intermediate shaft and are non-rotatably connected to the intermediate shaft by a respective one of the seventh and eighth clutches, and the first and second ring gear shaft gears are non-rotatably connected to the ring gear shaft.

6. A vehicle transmission in accordance with claim 4, wherein the third clutch is disengageable simultaneously with engagement of the first and fifth clutches.

7. A vehicle transmission in accordance with claim 4, wherein the fourth clutch is disengageable simultaneously with engagement of the second and sixth clutches.

8. A vehicle transmission in accordance with claim 4, wherein the sun gear shaft is situated coaxially to the ring gear shaft and extends through the ring gear shaft.

9. An automatic vehicle transmission comprising: an input shaft and an output shaft; a planetary gear train connected to the input shaft and connected to the output shaft through a CVT variable speed drive having two variable speed drive shafts and at least one pair of gears; at least three clutches, operation of which enables selection of the gear ranges R, N, D-Low, and D-High; wherein the planetary gear train is designed a plus gear unit having a ring gear non-rotatably connected to the input shaft;

wherein the planetary gear train includes two planet carriers that are non-rotatably connected to a common planet carrier shaft that is non-rotatably connected to a planet carrier shaft gear; a sun gear non-rotatably connected to a sun gear shaft that is non-rotatably connected to a sun gear shaft gear;

a first variable speed drive shaft non-rotatably connected to a first variable speed drive shaft gear through an intermediate gear that meshes with the planet carrier shaft gear;

a second variable speed drive shaft is non-rotatably connected to a second variable speed drive shaft gear and carries a third variable speed drive shaft gear that is rotatably supported on it;

an intermediate shaft is provided and is non-rotatably connected to a first intermediate shaft gear that meshes with the sun shaft gear and with the second variable speed drive shaft gear and a second intermediate shaft gear and a third intermediate shaft gear supported on the intermediate shaft;

a first output shaft gear is rotatably supported on the output shaft and meshes with the third variable speed drive shaft gear and with the second intermediate shaft gear, wherein the output shaft supports a second output shaft gear that meshes with the third intermediate shaft gear;

a shaft coupling with which the first variable speed drive shaft is non-rotatably connected to the output shaft;

a reverse clutch with which the third variable speed drive shaft gear is non-rotatably connected to the second variable speed drive shaft;

a first clutch with which the second intermediate shaft gear is non-rotatably connected to the intermediate shaft, and a third clutch with which the first output shaft gear is non-rotatably connected to the output shaft; and a fourth clutch with which the output shaft is non-rotatably connected through the second output shaft gear with the third intermediate shaft gear that is non-rotatably connected to the intermediate shaft.

10. A vehicle transmission in accordance with claim 9, wherein the sun gear shaft is situated coaxially to the planet carrier shaft and extends through the planet carrier shaft.

11. A vehicle transmission in accordance with claim 9, wherein the sun gear shaft is situated coaxially to the ring gear shaft and extends through the ring gear shaft.

* * * * *